June 30, 1925
J. G. DOTY
LIQUID DISPENSING NOZZLE
Filed Nov. 17, 1924
1,543,827
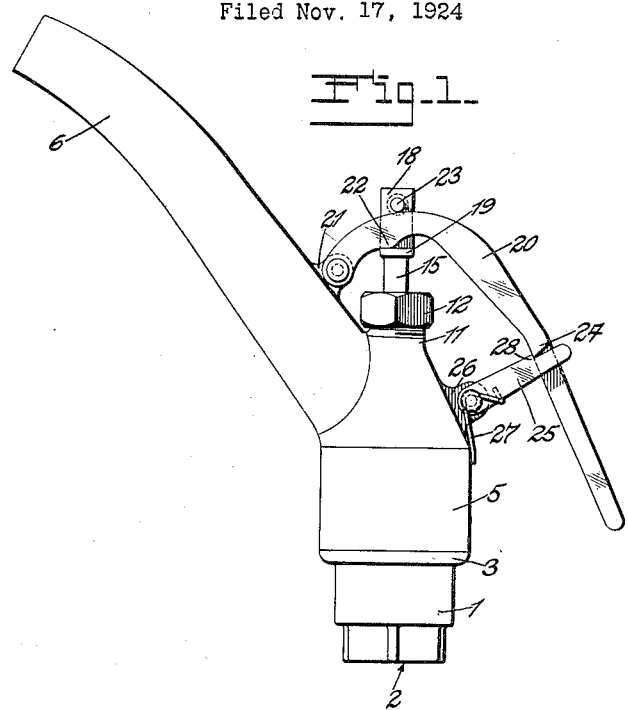
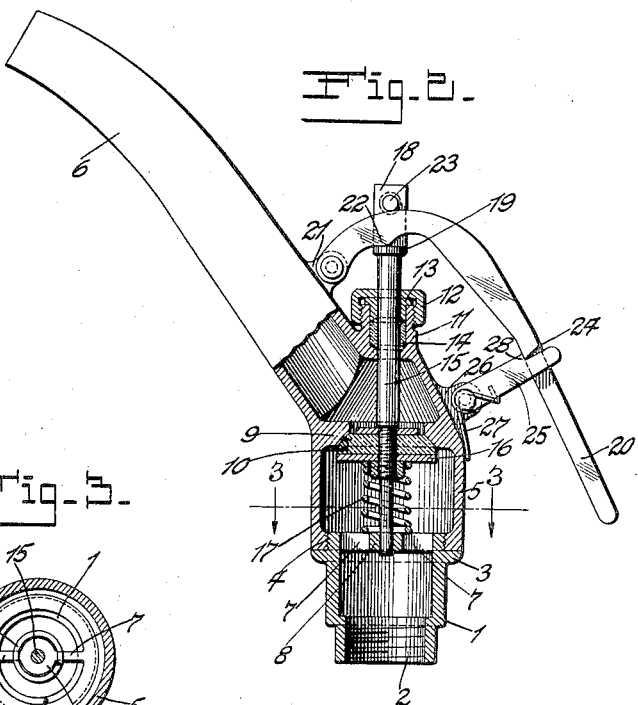
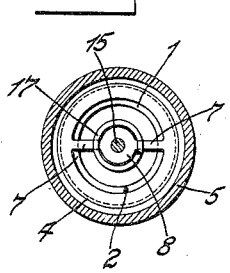
Inventor:
Jerald G. Doty,
His Attorneys.

Patented June 30, 1925.

1,543,827

UNITED STATES PATENT OFFICE.

JERALD G. DOTY, OF ST. LOUIS, MISSOURI, ASSIGNOR TO J. G. DOTY PUMP COMPANY, OF ST. LOUIS, MISSOURI, A CORPORATION OF MISSOURI.

LIQUID-DISPENSING NOZZLE.

Application filed November 17, 1924. Serial No. 750,235.

*To all whom it may concern:*

Be it known that I, JERALD G. DOTY, a citizen of the United States, residing at the city of St. Louis and State of Missouri, have invented a new and useful Liquid-Dispensing Nozzle, of which the following is a specification.

This invention relates to improvements in liquid dispensing nozzles, and particularly to the type of nozzle having a manually controlled valve and arranged for application primarily for dispensing gasoline from gasoline filling pumps.

An object of the invention is to provide a nozzle having an internally disposed valve arranged for manual operation, whereby the valve is opened, in combination with means for locking the valve in closed adjustment and so arranged that when the valve is closed the flow of liquid is cut off from the upper chamber of the valve body through which the valve stem projects to the exterior.

Additional advantages of the construction will be apparent from the following detailed description thereof, taken in connection with the accompanying drawing in which—

Fig. 1 is a side elevation.

Fig. 2 is a side elevation partially in section showing the internal construction of the valve.

Fig. 3 is a cross section taken on the line 3—3 of Fig. 2.

In the embodiment of the invention illustrated in the drawing the nozzle is shown as comprising an inlet conduit having a cylindrical portion 1 and an internally threaded polygonal portion 2 for attachment to a hose coupling, the upper end of the portion 1 being provided with an annular flange 3 and an exteriorly threaded portion 4, whereby it is attached to the valve body 5 which has integrally connected therewith an extension 6 constituting the delivery nozzle.

Across the shoulder of the inlet conduit is a rib 7 having a central portion 8 with an opening therethrough constituting a guide for the lower end of the valve rod. The valve body 5 has an internally formed horizontal partition wall 9 through which there is an opening, the lower edges of which are beveled at 10 forming a valve seat for a poppet valve. The partition wall 9 divides the valve body into an upper and a lower chamber and the wall of the upper chamber is extended to form an exteriorly threaded cylindrical projection 11 at the top of the valve. The projection 11 supports by screw engagement a packing gland 12 within which there is a follow bushing 13 bearing against a quantity of packing material 14, the parts together constituting a standard stuffing box for the valve rod 15 that extends therethrough, the upper end of which projects beyond the upper face of the stuffing box and the lower end of which extends through the guide formed by the member 7—8.

The valve rod supports a plural piece valve plug 16 that seats on the valve seat 10 and is normally actuated to closed position by an expansion spring 17 disposed between the under face of the valve plug and the member 7—8. The upper end of the valve rod 15 has a flattened extension 18 at the base of which is a head 19.

A curved lever 20 is pivoted to an ear 21 formed on the exterior wall of the member 6, said lever having a cam face 22 that coacts with the head 19 to depress the valve stem as the lower end of the lever is drawn inwardly, said cam moving the valve stem downwardly on a true vertical line in opposition to the spring 17. Above the cam surface of the lever is an abutment member 23 which may be in the form of a pin or roller and which serves to hold the cam surface of the lever in proper alinement for coaction with the head 19.

The lever 20 is provided with a shoulder 24 that coacts with a locking pawl 25 pivoted to an ear 26 formed on the exterior surface of the valve body and being normally actuated to raised position by a torsion spring 27, the pawl 25 being notched at 28 to engage with a shoulder 24 on the lever. As illustrated in the drawing the lock pawl is shown in locking engagement at which time the valve plug seats on the valve seat and closes the valve. In opening the valve the lock pawl is depressed in opposition to the torsion spring 27, thereby permitting the inward movement of the lever 20 in opening the valve.

It will be observed that the arrangement of the operating lever as disclosed permits the operation of the valve by the operator with the hand utilized in holding and guiding the nozzle and that the lever may be unlocked, the lever depressed to open the valve and the whole nozzle structure guided for dispensing the liquid with one hand.

It will be further observed that the valve body is divided into two chambers and that the valve rod projects through the upper one of these chambers so that when the valve is closed there will be no pressure against the stuffing box surrounding the valve rod, thereby preventing leakage of the liquid when the valve is closed.

It will also be observed that the construction is so simplified that it may be economically manufactured and that it is compact so that it may be readily operated.

I am aware that the invention may be modified in certain particulars without departing from the spirit and scope thereof.

I do not limit myself therefore to unessential details, but what I claim and desire to secure by Letters Patent is:

1. A device of the character described comprising a combined handle and valve chamber, an inlet conduit to one end thereof arranged for attachment to a hose connection, a delivery nozzle extending obliquely from the other end of said handle and valve chamber, a valve in said valve chamber at right angles to the axis thereof for opening and closing communication to said nozzle, a rod extending through the end wall of and axially through said valve chamber, and a lever having one end pivoted to said nozzle and engaging said rod and being engageable by the hand holding said handle and valve chamber to cause said rod to open said valve.

2. A device of the character described comprising a combined valve chamber and handle, an inlet conduit to one end of said chamber and handle, a delivery nozzle extending obliquely from the other end of said chamber and handle leaving the surface between said nozzle and said conduit engageable as a handle by one hand, a wall in said chamber between said conduit and said nozzle at right angles to the axis of said chamber and having an opening therethrough, a valve in said chamber at right angles to the axis thereof controlling said opening, a spring in said chamber actuating said valve to close said opening, a rod attached to said valve and extending through said opening and through the end wall of said chamber, and a lever having one end pivoted to said nozzle and engaging said rod and being engageable by the hand holding said handle and chamber to actuate said rod in a direction to move said valve in opposition to said spring and to the pressure of the liquid in said chamber to open said opening.

3. A device of the character described comprising a combined valve chamber and handle, an inlet conduit to one end of said chamber and handle, a delivery nozzle extending obliquely from the other end of said chamber and handle leaving the surface between said nozzle and said conduit engageable as a handle by one hand, a wall in said chamber between said conduit and said nozzle at right angles to the axis of said chamber and having an opening therethrough, a valve in said chamber at right angles to the axis thereof controlling said opening, a spring in said chamber actuating said valve to close said opening, a rod attached to said valve and extending through said opening and through the end wall of said chamber, a lever having one end pivoted to said nozzle and engaging said rod and being engageable by the hand holding said handle and chamber to actuate said rod in a direction to move said valve in opposition to said spring and to the pressure of the liquid in said chamber to open said opening, and means supported by said chamber for holding said lever in position to prevent operation of said rod.

JERALD G. DOTY.